Jan. 16, 1934. C. S. BROWN 1,943,419
TAPERED ROLLER BEARING
Filed Sept. 22, 1932
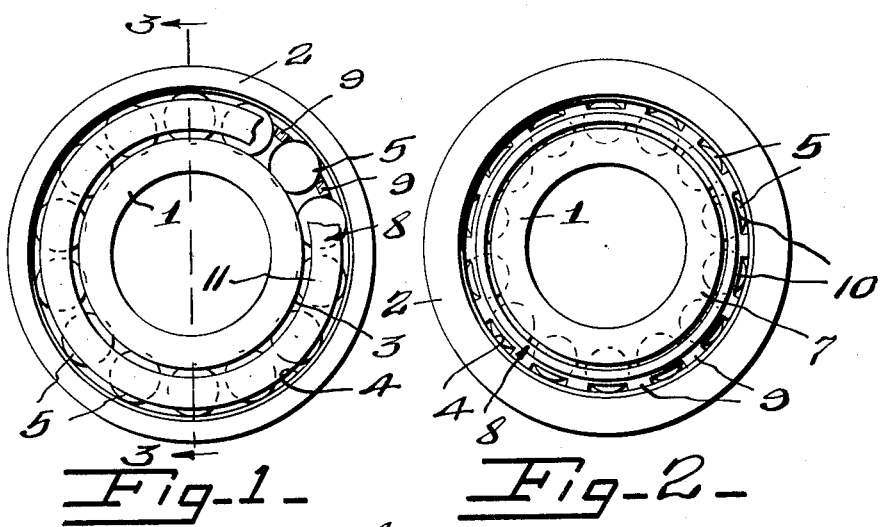
Fig-1-  Fig-2-
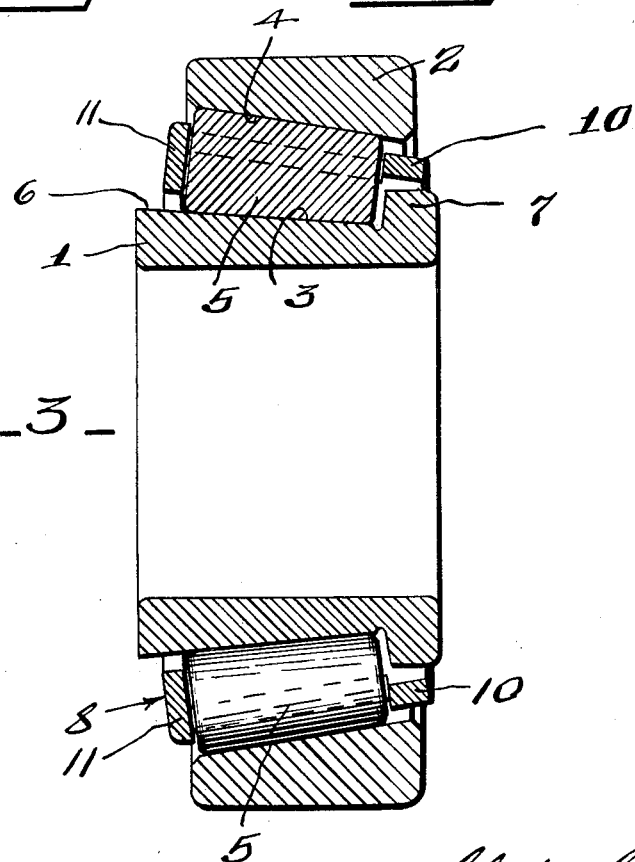
Fig-3-
INVENTOR.
Charles S. Brown
BY Bodell & Thompson
ATTORNEYS.

Patented Jan. 16, 1934

1,943,419

UNITED STATES PATENT OFFICE 1,943,419

TAPERED ROLLER BEARING

Charles S. Brown, Syracuse, N. Y.

Application September 22, 1932
Serial No. 634,414

1 Claim. (Cl. 308—214)

This invention relates to tapered, or conical, roller bearings, and has for its object a roller bearing in which the tapered rollers are held from misalinement by the cage, in contradistinction to a special abutment surface, or collar, provided on the inner conical raceway at the larger end thereof.

The invention consists in the novel features and in the combinations and constructions hereinafter set forth and claimed.

In describing this invention, reference is had to the accompanying drawing in which like characters designate corresponding parts in all the views.

Figures 1 and 2 are opposite end elevations of the roller bearing embodying my invention.

Figure 3 is an enlarged, sectional view on line 3—3, Figure 1.

This tapered roller bearing comprises inner and outer raceways 1 and 2 having opposing conical bearing faces 3, 4, tapered or conical rollers 5 between the surfaces 3, 4, and coacting therewith, and a cage for the rollers having means coacting with the outer larger ends of the rollers for holding them in alinement.

Heretofore, the rollers have been held in alinement by an abutment, or collar, provided on the inner raceway at the larger end of the cone formation thereof, and against which the larger ends of the rollers thrust, so that if the rollers tend to twist out of alinement the surface of the collar prevents them from twisting. The outer raceway 2 is unprovided with a shoulder at either end thereof for engaging the end faces of the rollers.

By my construction, the collar at the larger end of the inner conical raceway is dispensed with, and the conical bearing face 3 extends to the larger end of the inner conical raceway 1, as clearly shown at 6, Figure 3.

The inner raceway 1 is provided with the usual shoulder or a collar 7 at the smaller end of the conical surface 3, this being merely for the purpose of preventing the rollers held in the cage from displacement after being assembled. The incline of the conical surfaces 3 and 4 prevent axial displacement of the raceways and rollers.

8 designates the cage, which may be of any suitable construction, except for the abutment or shoulder coacting with the larger ends of the rollers to hold them from misalinement.

As here illustrated, the cage includes spacer bars 9 between the rollers, and heads 10 and 11 at opposite ends of the bars and opposite ends of the rollers. The head 11, at the larger ends of the rollers, is a slightly conical flange extending inwardly from like ends of the spacer bars 9 toward the conical surface 3 of the inner raceway 1, and terminating at its inner edge close to the surface 3, whereby the portions of the head, or flange 11, which coact with the larger ends of the rollers, are of nearly the same area as the larger ends of the rollers, thereby providing a wide flat surface against which the larger end surfaces of the rollers may thrust, this large surface holding the rollers from misalinement and performing the function of the collar heretofore provided at the larger end of the inner raceway. Hence, the means for alining the rollers is self-contained with the cage which holds the rollers.

During continued use of the bearing, the spacing bars 9 wear, and clearances are formed which permit the rollers to twist, or get out of alinement, unless something is provided for holding them in alinement. The wide head or flange 11 coacting with the larger ends of the rollers holds the rollers in alinement without the use of a shoulder on the inner raceway at the larger end thereof, which shoulder must be accurately machined or located. By eliminating this shoulder, a wider conical surface on the inner raceway is provided upon which the rollers work and take up looseness as the conical surfaces wear, thus extending the life of the bearing.

In my bearing, the flange or head 11 holds the rollers, under these conditions, from twisting misalinement and the flange or head 11 can be initially accurately located to properly coact with the rollers because it is self-contained with the rollers, and once located remains in the same relation to the ends of the rollers for the life of the bearing, regardless of the wear of the tapered bearing faces. While in the tapered bearings heretofore used, the collar, at the larger end of the conical surface of the inner raceway, must be accurately located with respect to the length of the rollers and any minute variations, that are bound to occur, in the length of rollers supposed to be the same length. Also, in my bearing, the elimination of the collar or shoulder on the inner raceway provides extra wearing surface to compensate for wear as the guide flange or head 11 moves axially with the rollers as they wear in contradistinction to remaining stationary as with the fixed shoulder heretofore used on the inner raceway to abut against the larger ends of the rollers. This guide flange 11 also greatly strengthens and makes the cage much more rigid radially, it being an angular flange.

This bearing therefore results in economy in manufacture and easily obtained accuracy, because the alining means for the rollers is self-contained with the cage for the rollers, and can be adapted to the rollers, or variations therein, when assembled with the rollers.

What I claim is:

A tapered roller bearing comprising inner and outer raceways having opposing conical surfaces, the conical surface of the inner raceway at the larger end of the cone extending to the outer end of the inner raceway and beyond the outer ends of the tapered rollers, the tapered rollers between said conical surfaces and bearing throughout their entire length on both of said surfaces, and a cage for the rollers, said cage being provided with spacing bars between the rollers engaging the peripheries of the rollers, and a flat annular shoulder engaging the end faces of the rollers at the larger ends thereof, the surfaces of the shoulder opposed to each roller being nearly as of great area as that of the end surface of the roller, whereby the surfaces of the shoulder thrusting against the larger ends of the rollers holds the rollers in alinement and from outward displacement.

CHARLES S. BROWN.